United States Patent
Lee et al.

(10) Patent No.: US 10,014,985 B2
(45) Date of Patent: Jul. 3, 2018

(54) METHOD FOR DETERMINING VALIDITY OF SCHEDULING INFORMATION IN WIRELESS COMMUNICATION SYSTEM SUPPORTING USAGE CHANGE OF WIRELESS RESOURCE AND APPARATUS THEREFOR

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 15/024,517

(22) PCT Filed: Sep. 25, 2014

(86) PCT No.: PCT/KR2014/008959
§ 371 (c)(1),
(2) Date: Mar. 24, 2016

(87) PCT Pub. No.: WO2015/046913
PCT Pub. Date: Apr. 2, 2015

(65) Prior Publication Data
US 2016/0233986 A1 Aug. 11, 2016

Related U.S. Application Data

(60) Provisional application No. 61/882,580, filed on Sep. 25, 2013.

(51) Int. Cl.
*H04L 1/18* (2006.01)
*H04W 72/12* (2009.01)
(Continued)

(52) U.S. Cl.
CPC ........... *H04L 1/1812* (2013.01); *H04L 5/00* (2013.01); *H04W 72/121* (2013.01);
(Continued)

(58) Field of Classification Search
CPC ...... H04L 1/1812; H04L 5/00; H04W 72/121; H04W 72/1273; H04W 72/1284; H04W 72/1289; H04W 72/0446
(Continued)

(56) References Cited

U.S. PATENT DOCUMENTS

2011/0249619 A1    10/2011  Yu et al.
2012/0113831 A1*   5/2012   Pelletier ............... H04L 5/0053
                                                            370/252
(Continued)

FOREIGN PATENT DOCUMENTS

CN    103283156    9/2013
CN    103314621    9/2013
(Continued)

OTHER PUBLICATIONS

Samsung, "False Alarm Handling in UL-DL Reconfiguration," 3GPP TSG RAN WG1 #72, R1-130292, Jan. 2013, 3 pages.
(Continued)

*Primary Examiner* — Obaidul Huq
(74) *Attorney, Agent, or Firm* — Lee Hong Degerman Kang & Waimey

(57) ABSTRACT

The present invention relates to a method for transmitting and receiving signals to/from a plurality of coordinated multiple-point transmission (CoMP) cells of a terminal in a wireless communication system supporting the usage change of a wireless resource. Specifically, the method comprises the steps of receiving, at a first subframe, uplink scheduling information indicating a second subframe from a plurality of CoMP cells; and if it is determined that the
(Continued)

uplink scheduling information is valid, transmitting a physical uplink shared channel (PUSCH) at the second subframe.

5 Claims, 11 Drawing Sheets

(51) Int. Cl.
*H04L 5/00* (2006.01)
*H04W 72/04* (2009.01)
(52) U.S. Cl.
CPC ... *H04W 72/1273* (2013.01); *H04W 72/1284* (2013.01); *H04W 72/1289* (2013.01); *H04W 72/0446* (2013.01)
(58) Field of Classification Search
USPC .......................................... 370/310, 328, 329
See application file for complete search history.

(56) References Cited

U.S. PATENT DOCUMENTS

2013/0121186 A1  5/2013  Vajapeyam et al.
2014/0161052 A1* 6/2014  Kazmi ................... H04L 5/001
                                                           370/329
2015/0009922 A1* 1/2015  Hoshino ............... H04L 5/0053
                                                           370/329
2016/0080133 A1* 3/2016  Golitschek Edler von
                                     Elbwart ........... H04W 72/0446
                                                           370/280

FOREIGN PATENT DOCUMENTS

WO    2012/128490    9/2012
WO    2013/095041    6/2013

OTHER PUBLICATIONS

PCT International Application No. PCT/KR2014/008959, Written Opinion of the International Searching Authority dated Jan. 8, 2015, 18 pages.

The State Intellectual Property Office of the People's Republic of China Application No. 201480052234.9, Office Action dated Jan. 22, 2018, 7 pages.

* cited by examiner

FIG. 2
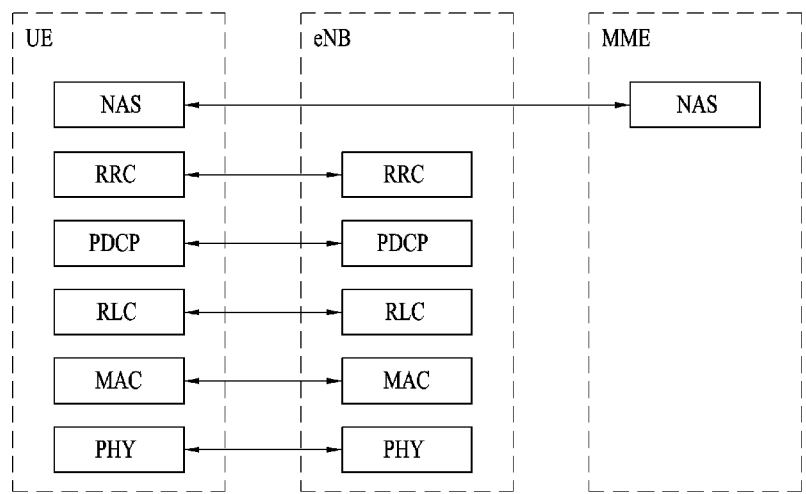
(a) Control-plane protocol stack
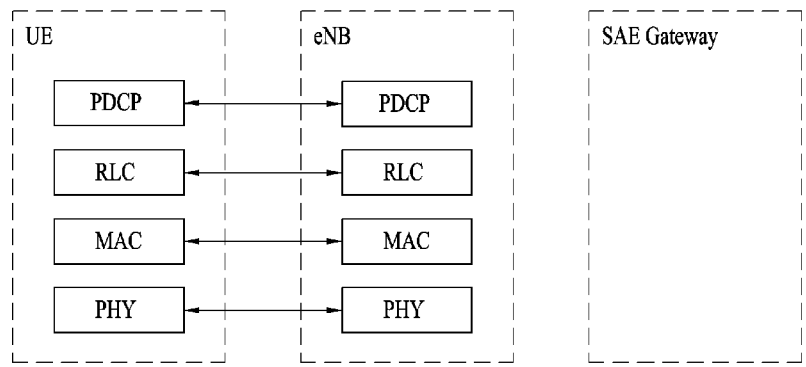
(b) User-plane protocol stack

METHOD FOR DETERMINING VALIDITY OF SCHEDULING INFORMATION IN WIRELESS COMMUNICATION SYSTEM SUPPORTING USAGE CHANGE OF WIRELESS RESOURCE AND APPARATUS THEREFOR

CROSS-REFERENCE TO RELATED APPLICATIONS

This application is the National Stage filing under 35 U.S.C. 371 of International Application No. PCT/KR2014/008959, filed on Sep. 25, 2014, which claims the benefit of U.S. Provisional Application No. 61/882,580, filed on Sep. 25, 2013, the contents of which are all hereby incorporated by reference herein in their entirety.

TECHNICAL FIELD

The present invention relates to wireless communication system, and more particularly, to a method for determining validity of scheduling information in a wireless communication system supporting usage change of a radio resource and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

In order to assist an eNB and efficiently managing a wireless communication system, a UE periodically and/or aperiodically reports state information about a current channel to the eNB. The reported channel state information may include results calculated in consideration of various situations, and accordingly a more efficient reporting method is needed.

DISCLOSURE

Technical Problem

Based on the aforementioned discussion, hereinafter, an object of the present invention is to provide a method for determining validity of scheduling information in a wireless communication system supporting usage change of a radio resource and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for transmitting and receiving signals to and from a plurality of coordinated multiple-point transmission (CoMP) cells of a user equipment in a wireless communication system supporting a usage change of a radio resource comprises the steps of receiving, at a first subframe, uplink scheduling information indicating a second subframe from the plurality of CoMP cells; and if it is determined that the uplink scheduling information is valid, transmitting an uplink data channel (physical uplink shared channel (PUSCH)) at the second subframe.

Moreover, the first subframe and the second subframe may be configured in accordance with an uplink-downlink timeline defined to change a usage of at least a part of radio resources corresponding to a reference HARQ timeline.

Moreover, the scheduling information may be determined not to be valid if all of the plurality of CoMP cells perform downlink communication at the first subframe.

Moreover, the scheduling information may be determined to be valid if uplink communication is performed for all of the plurality of CoMP cells at the second subframe.

Moreover, the scheduling information may be determined to be valid if uplink communication is performed for at least a part of the plurality of CoMP cells at the second subframe.

Moreover, the scheduling information may be determined to be valid if uplink communication is performed commonly for reference HARQ timelines configured for each of the plurality of CoMP cells at the second subframe.

Moreover, the scheduling information may be determined to be valid if uplink communication is performed on a reference HARQ timeline configured for at least one of the plurality of CoMP cells at the second subframe.

Moreover, a field that includes information indicating a specific one of the plurality of CoMP cells may be configured on a DCI format defined for the uplink scheduling information.

Moreover, the uplink scheduling information may be determined to be valid if the first subframe is a subframe indicated to be valid by a previously defined signal.

Moreover, the method may further comprise the step of receiving configuration for each of a downlink transmission point and an uplink reception point through a previously defined signal.

To solve the aforementioned technical problems, according to another aspect of the present invention, a method for transmitting and receiving signals to and from a plurality of coordinated multiple-point transmission (CoMP) cells of a user equipment in a wireless communication system supporting a usage change of a radio resource comprises the steps of receiving, at a first subframe, downlink scheduling information indicating a second subframe from the plurality of CoMP cells; and if it is determined that the downlink scheduling information is valid, receiving a downlink data channel (physical downlink shared channel (PDSCH)) at the second subframe.

Advantageous Effects

According to the present invention, validity determination of scheduling information in a wireless communication system supporting a usage change of a radio resource can be supported efficiently.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a user equipment and an E-UTRAN based on the 3GPP radio access network standard;

BEST MODE FOR CARRYING OUT THE INVENTION

Figure 1:
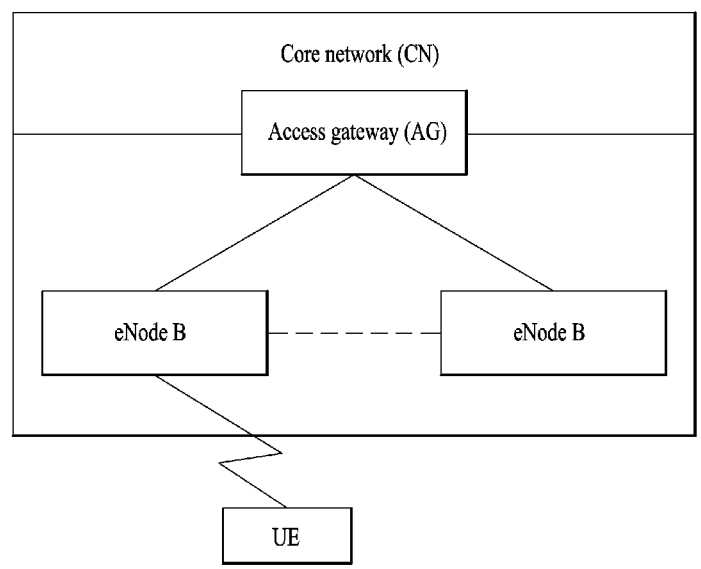
FIG. 1 is a diagram illustrating a network structure of an Evolved Universal Mobile Telecommunications System (E-UMTS) which is an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
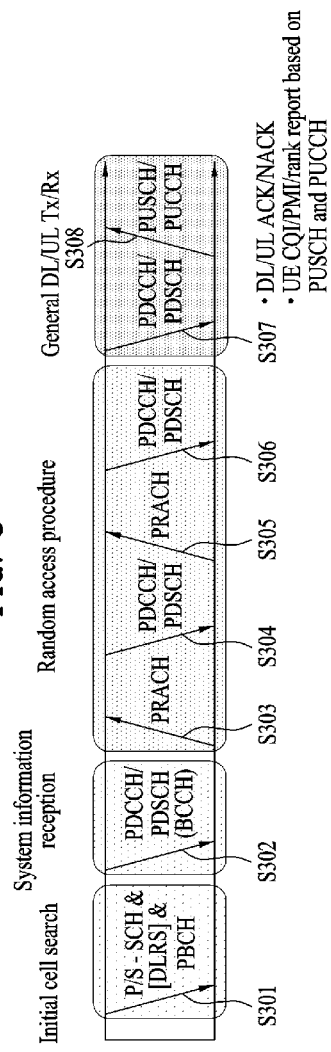
FIG. 3 is a diagram illustrating physical channels used in a 3GPP system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
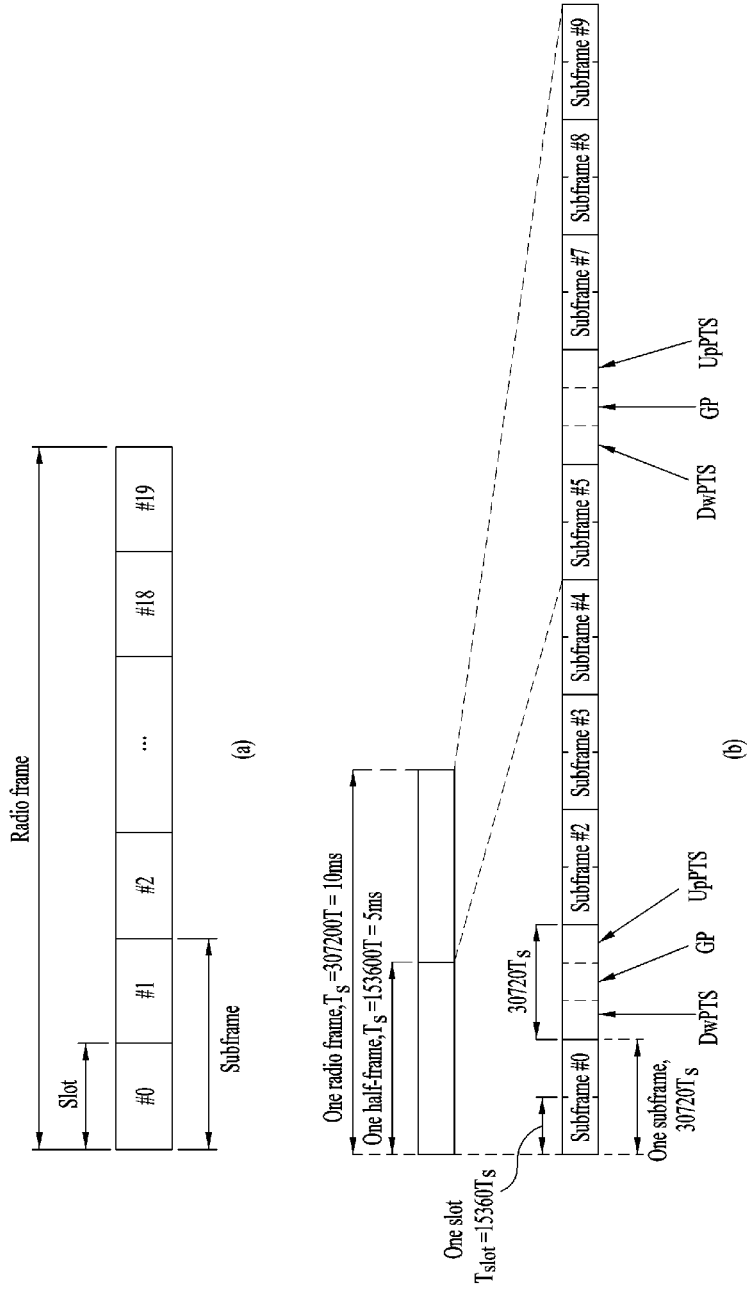
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
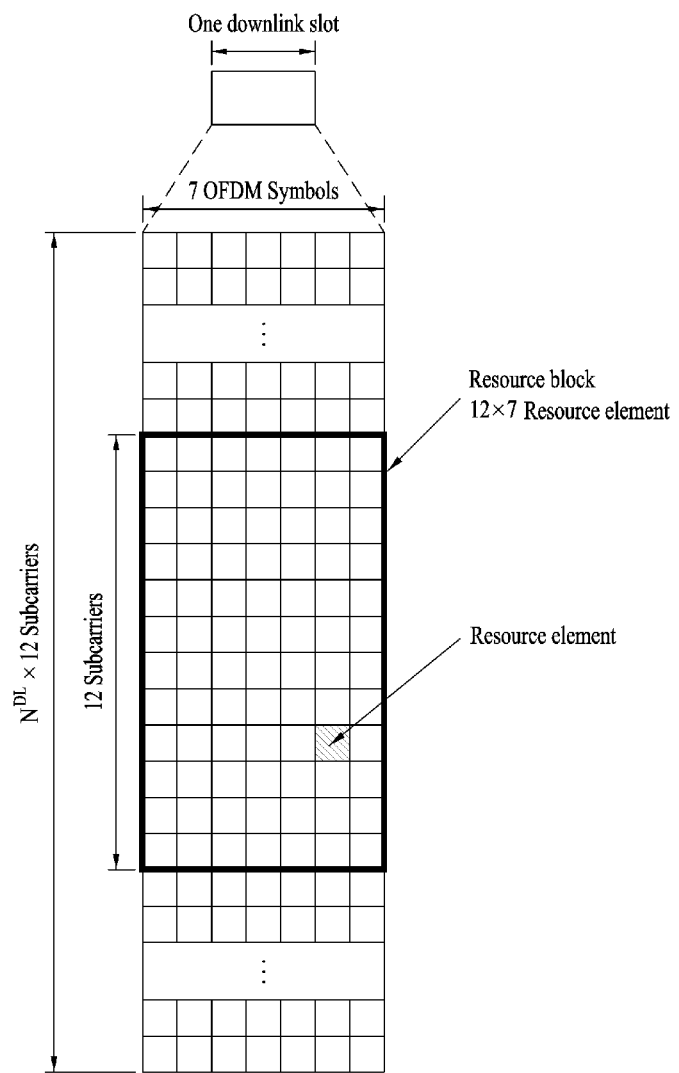
FIG. 5 is a diagram illustrating an example of a resource grid of a downlink slot.

FIG. 5 illustrates a resource grid for a DL slot.

Referring to FIG. 5, a DL slot includes $N_{symb}^{DL}$ OFDM symbols in the time domain and $N_{RE}^{DL}$ resource blocks (RBs) in the frequency domain. Since each RB includes $N_{sc}^{RB}$ subcarriers, a DL slot includes $N_{RE}^{DL} \times N_{sc}^{RE}$ subcarriers in the frequency domain. While FIG. 5 illustrates that a DL slot includes 7 OFDM symbols and an RB includes 12 subcarriers, embodiments of the present invention are not limited thereto. For example, the number of OFDM symbols included in a DL slot may be changed according to the length of a cyclic prefix (CP).

Each element in the resource grid is referred to as a resource element (RE). Each RE is indicated by an OFDM symbol index and a subcarrier index. One RB consists of $N_{symb}^{DL} \times N_{sc}^{RB}$ REs. The number of RBs ($N_{RB}^{DL}$) included in a DL slot depends on a DL transmission bandwidth set in a cell.

Figure 6:
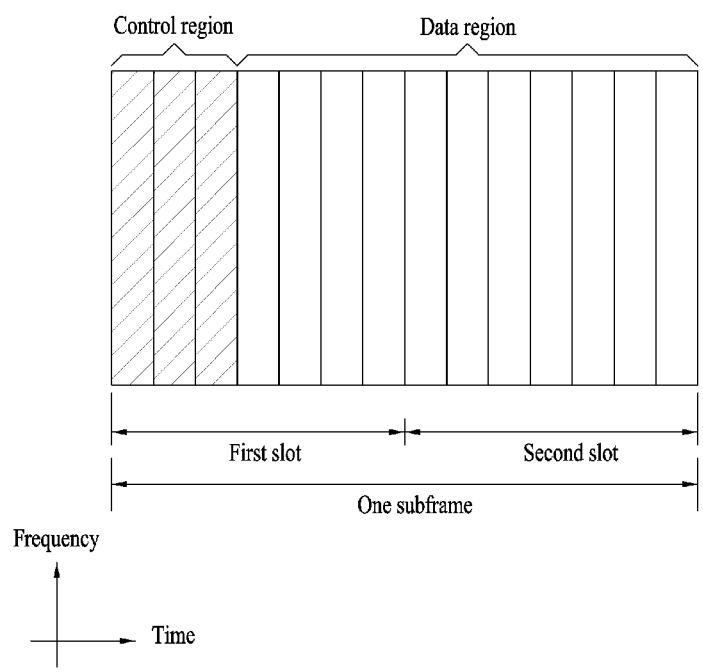
FIG. 6 is a diagram illustrating a structure of a downlink subframe.

FIG. 6 illustrates the structure of a DL subframe.

Referring to FIG. 6, up to three or four OFDM symbols positioned at the front part of the first slot in a subframe correspond to a control region to which control channels are allocated. The other OFDM symbols in the subframe correspond to a data region to which a physical downlink shared channel (PDSCH) is allocated. Examples of the aquifer channels used in LTE include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH carries a HARQ acknowledgment (ACK)/negative-acknowledgment (NACK) signal in response to UL transmission HARQ ACK/NACK.

Control information carried on the PDCCH is called downlink control information (DCI). The DCI includes resource allocation information and other control information for a UE or a UE group. For example, the DCI includes DL/UL scheduling information, UL transmit (Tx) power control commands, etc.

The PDCCH carries information about resource allocation and a transmission format for a downlink shared channel (DL-SCH), information about resource allocation and a transmission format for an uplink shared channel (UL-SCH), paging information on a paging channel (PCH), system information on the DL-SCH, information about resource allocation for a higher-layer control message such as a random access response transmitted on the PDSCH, a Tx power control command set for individual UEs in a UE group, Tx power control commands, voice over Internet protocol (VoIP) activation indication information, etc. A plurality of PDCCHs may be transmitted in the control region. A UE may monitor a plurality of PDCCHs. A PDCCH is transmitted on an aggregation of one or more consecutive control channel elements (CCEs). A CCE is a logical allocation unit used to provide a PDCCH with a coding rate based on the state of a radio channel. A CCE corresponds to a plurality of resource element groups (REGs). The format of a PDCCH and the number of PDCCH bits are determined according to the number of CCEs. An eNB determines a PDCCH format according to DCI transmitted to a UE and adds cyclic redundancy check (CRC) to control information. The CRC is masked with an identifier (ID) (e.g. a radio network temporary identifier (RNTI)) according to the owner or use of the PDCCH. For example, if the PDCCH is intended for a specific UE, the CRC may be masked with the ID (e.g., cell-RNTI (C-RNTI)) of the specific UE. If the PDCCH is intended for a paging message, the CRC thereof may be masked with a paging ID (e.g., paging-RNTI (P-RNTI)). If the PDCCH is intended for system information (particularly, a system information block (SIB)), the CRC thereof may be masked with a system information RNTI (SI-RNTI). If the PDCCH is intended for a random access response, the CRC thereof may be masked with a random access-RNTI (RA-RNTI).

Figure 7:
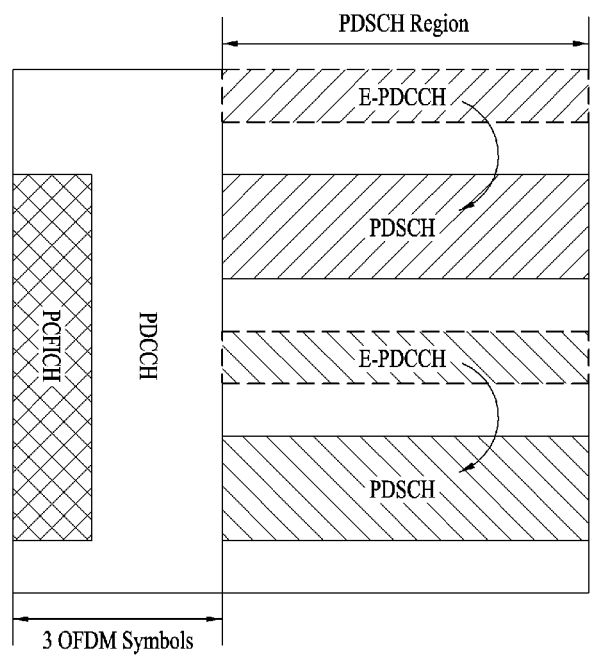
FIG. 7 is a diagram illustrating an example of an EPDCCH and a PDSCH scheduled by the EPDCCH.

FIG. 7 is a diagram illustrating an example of an EPDCCH and a PDSCH scheduled by the EPDCCH.

Referring to FIG. 7, the EPDCCH may be used by partially defining a PDSCH region for transmitting data, and the user equipment should perform a blind decoding procedure for detecting the presence of its EPDCCH. Although the EPDCCH performs the same scheduling operation (that is, PDSCH and PUSCH control) as that of the conventional legacy PDCCH, a greater number of EPDCCHs may be allocated to the PDSCH region if the number of user equipments which have accessed the same node as that of RRH. In this case, the number of times for blinding decoding that should be performed by the user equipment may be increased, whereby a problem may exist in that complexity may be increased.

Hereinafter, transmission modes will be described.

Downlink transmission modes as illustrated in Table 3 and Table 4 below are defined in the current 3GPP LTE standard document, specifically 3GPP TS 36.213 document. Also, the following transmission modes are configured for the user equipment through higher layer signaling, that is, RRC signaling.

TABLE 3

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD (see clause 7.1.3) or Transmit diversity |
| Mode 4 | DCI format 1A | Common and UE specific by C-RNTI | Transmit diversity |
| | DCI format 2 | UE specific by C-RNTI | Closed-loop spatial multiplexing(see clause 7.1.4)or Transmit diversity |

TABLE 3-continued

| Transmission mode | DCI format | Search Space | Transmission scheme of PDSCH corresponding to PDCCH |
|---|---|---|---|
| Mode 5 | DCI format 1A | Common and UE specific by C-RNTI | Transmit diversity |
|  | DCI format 1D | UE specific by C-RNTI | Multi-user MIMO(see clause 7.1.5) |
| Mode 6 | DCI format 1A | Common and UE specific by C-RNTI | Transmit diversity |
|  | DCI format 1B | UE specific by C-RNTI | Closed-loop spatial multiplexing (see clause 7.1.4) using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 (see clause 7.1.5A) or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity<br>MBSFN subframe: Single-antenna port, port 7 |
|  | DCI format 2C | UE specific by C-RNTI | Up to 8 layer transmission, ports 7-14 (see clause 7.1.5B)or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity<br>MBSFN subframe: Single-antenna port, port 7 |
|  | DCI format 2D | UE specific by C-RNTI | Up to 8 layer transmission, ports 7-14 (see clause 7.1.5B) or single-antenna port, port 7 or 8 |

TABLE 4

| Transmission mode | DCI format | Search Space | Transmission scheme of PDSCH corresponding to EPDCCH |
|---|---|---|---|
| Mode 1 | DCI format 1A | UE specific by C-RNTI | Single-antenna port, port 0 |
|  | DCI format 1 | UE specific by C-RNTI | Single-antenna port, port 0 |
| Mode 2 | DCI format 1A | UE specific by C-RNTI | Transmit diversity |
|  | DCI format 1 | UE specific by C-RNTI | Transmit diversity |
| Mode 3 | DCI format 1A | UE specific by C-RNTI | Transmit diversity |
|  | DCI format 2A | UE specific by C-RNTI | Large delay CDD (see clause 7.1.3) or Transmit diversity |

TABLE 4-continued

| Transmission mode | DCI format | Search Space | Transmission scheme of PDSCH corresponding to EPDCCH |
|---|---|---|---|
| Mode 4 | DCI format 1A | UE specific by C-RNTI | Transmit diversity |
|  | DCI format 2 | UE specific by C-RNTI | Closed-loop spatial multiplexing(see clause 7.1.4)or Transmit diversity |
| Mode 5 | DCI format 1A | UE specific by C-RNTI | Transmit diversity |
|  | DCI format 1D | UE specific by C-RNTI | Multi-user MIMO(see clause 7.1.5) |
| Mode 6 | DCI format 1A | UE specific by C-RNTI | Transmit diversity |
|  | DCI format 1B | UE specific by C-RNTI | Closed-loop spatial multiplexing (see clause 7.1.4) using a single transmission layer |
| Mode 7 | DCI format 1A | UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 (see clause 7.1.5A) or single-antenna port, port 7 or 8 |
| Mode 9 | DCI format 1A | UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2C | UE specific by C-RNTI | Up to 8 layer transmission, ports 7-14 (see clause 7.1.5B) or single-antenna port, port 7 or 8 |
| Mode 10 | DCI format 1A | UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2D | UE specific by C-RNTI | Up to 8 layer transmission, ports 7-14 (see clause 7.1.5B) or single-antenna port, port 7 or 8 |

The current 3GPP LTE standard document includes a downlink control information (DCI) format, which is defined according to a type of RNTI masked on PDCCH/EPDCCH. In particular, in case of a C-RNTI and an SPS C-RNTI, a transmission mode and a DCI format corresponding to the transmission mode, that is, a transmission mode-based DCI format, are shown. Also, a DCI format 1A, which is capable of being applied irrespective of each transmission mode, is defined in the document. Table 3 shows an example of a case that a type of RNTI masked on PDCCH corresponds to a C-RNTI. Table 4 shows an example of a case that a type of RNTI masked on EPDCCH corresponds to a C-RNTI. Moreover, the case that a type of RNTI masked on PDCCH/EPDDCH corresponds to an SPS C-RNTI will be understood in more detail with reference to the document 36.213 which is the LTE/LTE-A standard document.

For example, if a DCI format 1B is detected as a result of blind decoding performed for PDCCH masked with C-RNTI in a UE-specific search space in Table 3, PDSCH is decoded on the assumption that the PDSCH has been transmitted in accordance with a closed-loop spatial multiplexing scheme based on a single layer.

Figure 8:
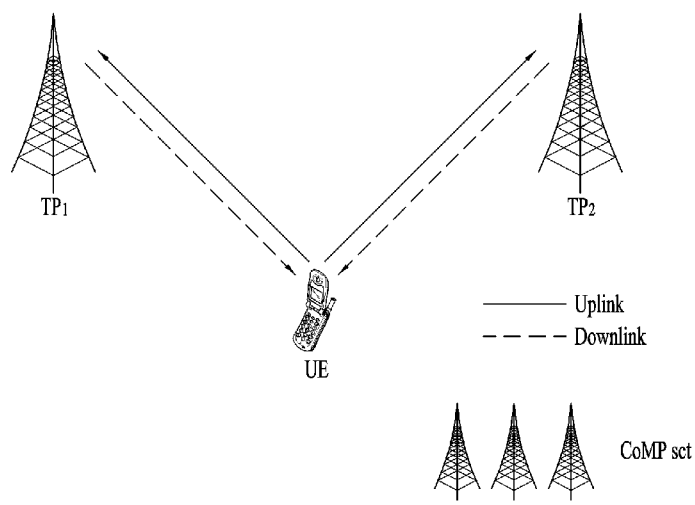
FIG. 8 is a diagram illustrating a coordinated multi-point (CoMP) system.

FIG. 8 is a diagram illustrating a coordinated multi-point (CoMP) system.

The CoMP scheme applicable to a downlink may include a Joint Transmission (JT) scheme, a Coordinated Scheduling/Beamforming (CS/CB) scheme, and a Dynamic Cell Selection (DCS) scheme.

The joint transmission scheme refers to a scheme for transmitting a downlink signal (for example, PDSCH, PDCCH, etc.) from a plurality of points (a part or the whole of points (for example, base station) which join CoMP operation). That is, data transmitted to a single UE may simultaneously be transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of points which join CoMP operation) at one time. That is, data transmitted to a single UE at a specific time is transmitted from one point, and the other point within points which join the CoMP operation at that time does not transmit data to the UE. The point for transmitting the data to the corresponding UE may dynamically be selected.

Meanwhile, according to the CS/CB scheme, points which join CoMP operation may cooperatively perform beamforming of data transmission to a single UE. Although only a serving cell transmits the data, user scheduling/beamforming may be determined by coordination of the points which join the corresponding CoMP operation.

In case of an uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme means that a plurality of reception points receive a signal transmitted through a PUSCH, and the CS/CB scheme means that only one point receives a PUSCH and scheduling/beamforming is performed.

If such a CoMP system is used, the UE may commonly receive data from a multi-cell base station. In addition, each base station may simultaneously support one or more UEs by using the same radio frequency resources to improve system performance. In addition, the base station may perform space division multiple access (SDMA) based on channel state information between the base station and the UE.

In a CoMP system, a serving base station and one or more cooperative base stations may be connected to a scheduler through a backbone network. The scheduler may operate by receiving information on a channel state between each UE and each cooperative base station, which is measured by each base station through the backbone network. For example, the scheduler may schedule information for coordinated MIMO operation with respect to a serving base station and one or more cooperative base stations. That is, the scheduler may directly send an instruction for coordinated MIMO operation to each base station.

As described above, the CoMP system may operate as a virtual MIMO system by grouping a plurality of transmission points into one group. Basically, a MIMO communication scheme based on multiple antennas may be applied to the CoMP system. A group of transmission points may be referred to as a CoMP set. Also, since transmission points are located in different areas in the CoMP system, different cell coverage may be provided. This CoMP system may be referred to as an inter-site CoMP system.

Referring to FIG. 8, an inter-site CoMP system including two Transmission Points (TPs) is illustrated, by way of example. To implement a CoMP scheme in 3GPP LTE Rel-11, Transmission Mode 10 (TM10) may be configured for the UE. The UE may transmit and receive signals to and from TPs (e.g., TP1 and TP2) which belong to the CoMP set. The UE may transmit channel state information on the TPs which belong to the CoMP set. In this case, RSs may be transmitted from the TPs of the CoMP set to the UE. If characteristics for channel estimation from different antenna ports of the different TPs can be shared among the antenna ports, the load and complexity of reception processing at the UE may be reduced. Also, if characteristics for channel estimation from different antenna ports of the same TP can be shared among the antenna ports, the load and complexity of reception processing at the UE may be reduced.

For channel estimation among the antenna ports, the LTE(-A) system has introduced the concept of Quasi Co-Located (QCL). For example, if the large-scale properties of a radio channel carrying a symbol transmitted through one antenna port can be inferred from a radio channel carrying a symbol transmitted through the other one antenna port, two antenna ports may be said that the two antenna ports are QCL. The large-scale properties of a radio channel include one or more of a delay spread, a Doppler spread, a Doppler shift, an average gain, and an average delay. For the convenience of description, quasi co-located will be abbreviated as QCL.

For example, if two antenna ports are said to be QCL, the large-scale properties of a radio channel from one antenna port is identical to those of a radio channel from the other antenna port. In the case where RSs are transmitted through a plurality of antenna ports, if the antenna ports transmitting the two different types of RSs are QCL, the large-scale properties of a radio channel from one antenna port may be replaced with those of a radio channel from the other antenna port.

According to the above-described concept of QCL, the UE may not assume the same large-scale properties between radio channels from non-QCL antenna ports. In this case, the UE should perform timing acquisition and tracking, frequency offset estimation and compensation, delay estimation, and Doppler estimation, independently for each of the no n-QCL antenna ports.

The UE may advantageously perform the following operations for antenna ports that can be assumed to be QCL.

In regard to delay spreads and Doppler spreads, the UE may equally apply the results of estimating the power delay profile, delay spread and Doppler spectrum, and Doppler spread of a radio channel from one antenna port to a Wiener filter or the like used during channel estimation of a radio channel from another antenna port.

In regard to frequency shifts and reception timings, after the UE performs time and frequency synchronization for one antenna port, the UE may apply the same synchronization to demodulation of another antenna port.

In regard to an average reception power, the UE may average Reference Signal Received Power (RSRP) measurements for two or more antenna ports.

UEs for which transmission modes TM8 to TM10 are configured may assume that antenna ports 7 to 14 are QCL. UEs for which transmission modes TM1 to TM9 are configured may assume that antenna ports 0 to 3, 5, and 7 to 22 are QCL. A UE for which the transmission mode TM 10 is configured may be set to one QCL type indicated by higher layer signaling (for example, RRC signaling). QCL type indicated by higher layer signaling may include a QCL type A and a QCL type B. For the QCL type A, the UE may assume that antenna ports 0 to 3 and antenna ports 7 to 22 are QCL. For the QCL type B, the base station may indicate CSI-RS resources to be QCL with an antenna port for a PDSCH through higher layer signaling (for example, RRC signaling), and the UE may assume that antenna ports 15 to 22 corresponding to a CSI-RS resource configuration received through higher layer signaling (for example, RRC signaling) and antenna ports 7 to 14 related to the PDSCH are QCL.

If the UE receives a specific DMRS-based DL-related DCI format through a control channel (PDCCH or EPDCCH), the UE performs data demodulation after performing channel estimation on the corresponding PDSCH through a DMRS sequence. For example, if the UE can assume that configurations of antenna ports for DMRSs received along with a DL scheduling grant are QCL with antenna ports that transmit CRSs of its DL serving cell or other cells, the UE may apply the large-scale properties of radio channels estimated from the CRS ports during channel estimation through the corresponding DMRS ports, thereby increasing the performance of a processor at a DMRS-based receiver. Accordingly, the assumption of QCL between antenna ports may be used for reception of various DL RSs, channel estimation, channel state reporting, etc.

Meanwhile, a new transmission mode, TM10 has been introduced to support a CoMP operation between a plurality of cells or TPs in a post-LTE-A Rel-11 system. Thus, a UE for which the transmission mode TM10 is configured may perform dynamic point selection (DPS)-based data detection/reception. For example, after the base station presets a plurality of parameter sets related to TM10 through higher layer signaling (for example, RRC signaling), the base station may transmit indication information indicating a specific one of the plurality of parameter sets to the UE through a specific field of a DL grant. The UE may perform a data reception operation corresponding to the DL grant based on the parameter set indicated by the specific field of the DL grant. The indication information indicating the specific parameter set among the plurality of parameter sets related to TM10 is referred to as a PDSCH RE mapping and Quasi-co-location Indicator (PQI). For the convenience of description, a parameter set related to TM10 may also be referred to as the PQI. A plurality of parameter sets are grouped into one parameter set group, which may be referred to as a PQI set. Therefore, one parameter set group (or one PQI set) may include a plurality of parameter sets (or PQIs) and one parameter set (or one PQI) may include a plurality of parameters required for data reception.

Based on the aforementioned description, the present invention describes a method for efficiently performing uplink communication in a specific coordinated multi-point (CoMP) communication user equipment (CoMP UE) if cells which join CoMP dynamically (that is, uplink→downlink or downlink→uplink) changes a radio resource usage (for example, uplink resource or downlink resource) in accordance with their load state change.

In this case, a radio resource usage change message (reconfiguration message) can be transmitted from a serving cell of the corresponding CoMP UE in the form of a higher layer signal (e.g., SIB/PBCH/MAC/RRC) or a physical layer signal (e.g., PDCCH/EPDCCH/PDSCH). Also, the corresponding usage change message (that is, reconfiguration message) may have one of i) a UE-specific characteristic, ii) a cell-specific characteristic and iii) a UE group-specific characteristic and iv) a UE group-common characteristic.

Additionally, the usage change message can be transmitted through a USS (UE-specific search space) or a CSS (common search space). The corresponding usage change message may be configured such that uplink-downlink (UL-DL) reconfiguration information of a serving cell and uplink-downlink reconfiguration information of other cells that (are received through an interface X2 or an optical fiber) perform cooperative communication with the serving cell may be transmitted together. Alternatively, the corresponding usage change message may be configured such that uplink-downlink (UL-DL) reconfiguration information of a serving cell (for example, PCell) and uplink-downlink reconfiguration information of other cells (for example, SCell) to which carrier aggregation (CA) is applied may be transmitted together.

Hereinafter, for the convenience of description, the present invention will be described based on a 3GPP LTE system. However, a range of a system to which the present invention is applied can be extended to a different system except the 3GPP LTE system.

Moreover, the embodiments of the present invention can be extended to a case that resources on a specific cell (or component carrier (CC)) are dynamically changed in accordance with a load state of the system under an environment to which carrier aggregation (CA) is applied.

Also, the embodiments of the present invention can be extended to a case that a usage of radio resources is dynamically changed under a TDD system or FDD system or TDD/FDD combined system.

However, for the convenience of description of the present invention, it is assumed that each cell which joins CoMP communication under a TDD system environment dynamically changes a usage of legacy radio resources in accordance with its system load state.

The legacy radio resources may be categorized into two types of resources due to dynamic change of the radio resource usage. In this case, the legacy radio resources may be categorized into a resource set (that is, static resource) used for static usage (or fixed usage) and a resource set (that is, flexible resource) of which usage is dynamically changed. For example, a resource set used as the same usage as that of uplink-downlink configuration on an SIB or continuously used as the same usage may be defined as a static resource set, and a resource set used (or that is likely to be used as a different usage) as a usage different from that of uplink-downlink configuration on the SIB may be defined as a flexible resource set. Otherwise, a resource set used (or continuously used as the same usage) as the same usage as that of uplink-downlink configuration configured at a previous usage change timing (for example, usage change based on previously defined usage change cycle) may be defined as a static resource set, and a resource set used (or likely to be used as a different usage) as a usage different from that of uplink-downlink configuration configured at a previous usage change timing may be defined as a flexible resource set. Otherwise, a resource set used (or continuously used as the same usage) as the same usage as that of uplink-downlink configuration (or uplink-downlink configuration of reference UL HARQ timeline) of a previously defined reference DL HARQ timeline may be defined as a static resource set, and a resource set used (or likely to be used as a different usage) as a usage different from that of uplink-downlink configuration (or uplink-downlink configuration of reference uplink HARQ timeline) of reference downlink HARQ timeline may be defined as a flexible resource set.

In this case, for example, the downlink/uplink HARQ timeline (that is, HARQ timeline configured for a purpose of maintaining a stable HARQ timeline regardless of (re-)change of uplink-downlink configuration) may be defined as one of i) a downlink/uplink HARQ timeline of a UL-DL configuration including a union of downlink subframes/a union of uplink subframes of reconfigurable UL-DL configuration candidates, ii) a downlink/uplink HARQ timeline of a UL-DL configuration including a union of downlink subframes/an intersection of uplink subframes of reconfigurable UL-DL configuration candidates, iii) a downlink/uplink HARQ timeline of a UL-DL configuration including an intersection of downlink subframes/a union of uplink subframes of reconfigurable UL-DL configuration candidates, and iv) a downlink/uplink HARQ timeline of a UL-DL configuration including an intersection of downlink subframes/an intersection of uplink subframes of reconfigurable UL-DL configuration candidates.

In more detail, an uplink resource set used (or continuously used as the same usage) as the same usage as that of uplink-downlink configuration of the reference downlink HARQ timeline may be defined as a static uplink resource set, and a downlink resource set used (or continuously used as the same usage) as the same usage as that of uplink-downlink configuration of a previously defined reference uplink HARQ timeline may be defined as a static downlink resource set. In this case, the downlink resource set of the uplink-downlink configuration of the reference downlink HARQ timeline may be defined as a flexible downlink resource set. Also, the uplink resource set of the uplink-downlink configuration of the reference uplink HARQ timeline may be defined as a flexible uplink resource set.

Figure 9:
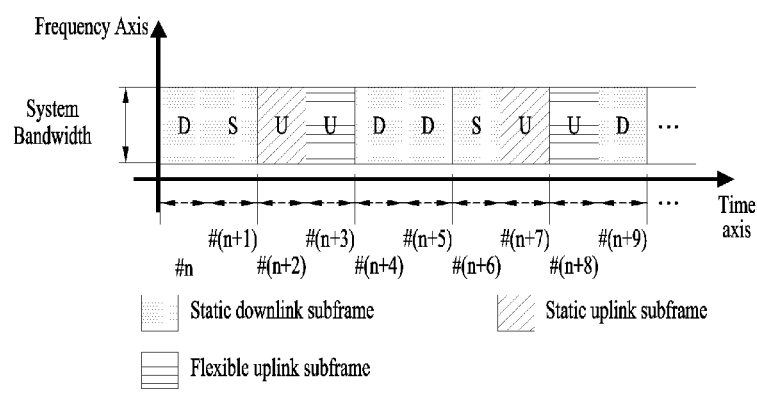
FIG. 9 is a diagram illustrating that legacy subframes are split into a static subframe set and a flexible subframe set under a TDD system environment.

FIG. 9 is a diagram illustrating that (legacy) subframes are split into a static subframe set and a flexible subframe set under a TDD system environment.

In FIG. 9, it is assumed that the legacy uplink-downlink configuration configured through an SIB (System Information Block) signal is an uplink-downlink configuration #1 (that is, DSUUDDSUUD) and that a serving cell notifies a UE of reconfiguration information of a usage of a radio resource through a previously defined signal.

Also, if a specific CoMP UE identifies UL-DL reconfiguration information of corresponding cells (for example, CoMP cells) through previously defined signaling/configuration/rule under an environment that cells which join CoMP communication dynamically change a radio resource usage in accordance with their load state, it is required to explicitly define a method for determining validity of uplink data channel (PUSCH) transmission related scheduling information (UL grant) or PHICH information, which is received at a random time. That is, an interference problem (for example, UL Tx UE-to-DL Rx UE interference, UL Tx UE-to-UL Rx eNB interference) caused by wrong uplink data channel (PUSCH) transmission of the corresponding CoMP UE can be reduced through the above method.

Figure 10:
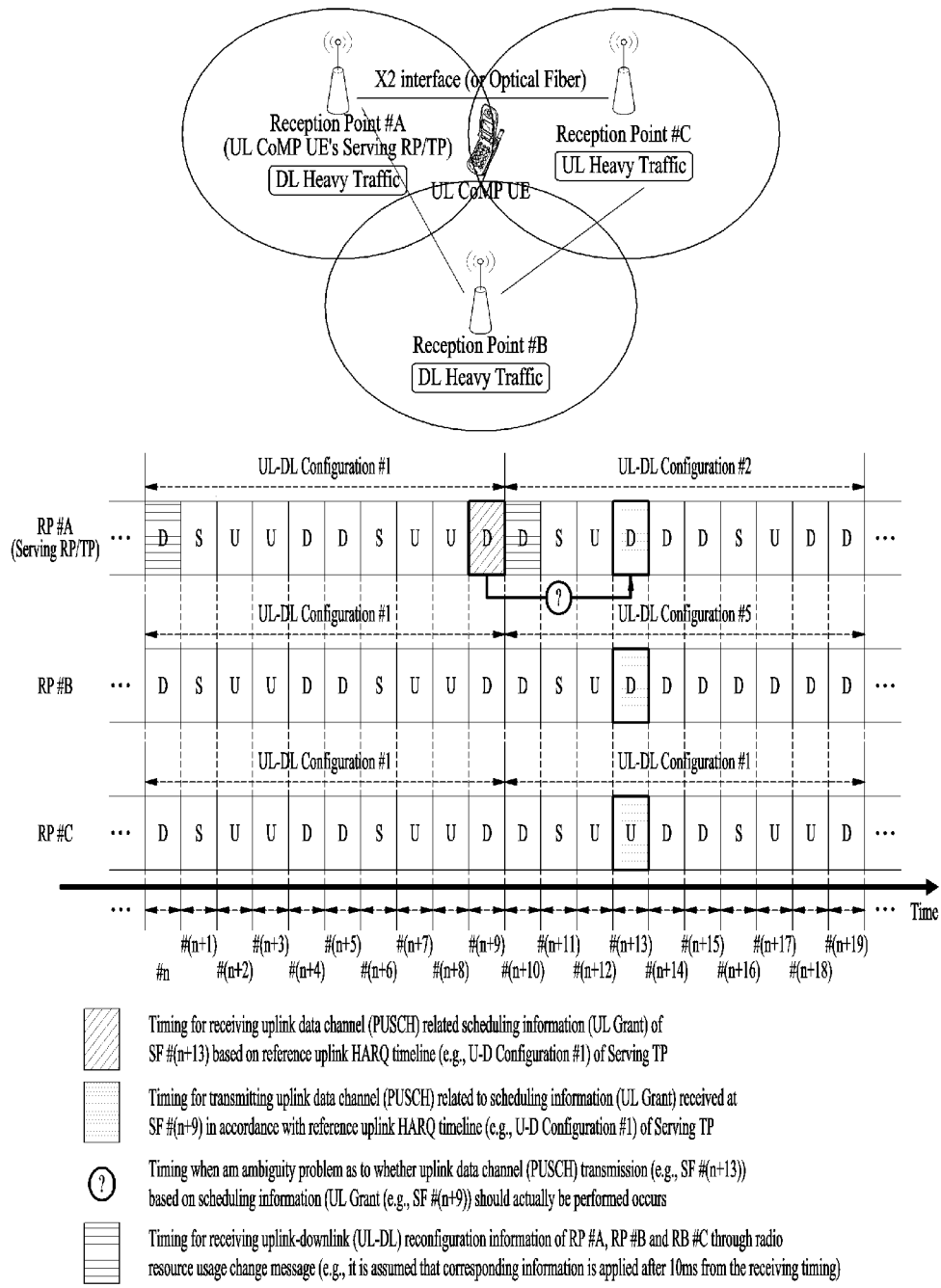
FIGS. 10 and 11 are diagrams illustrating problems occurring in an environment that cells joining uplink (UL) CoMP communication dynamically change a radio resource usage in accordance with their load state.
Figure 11:
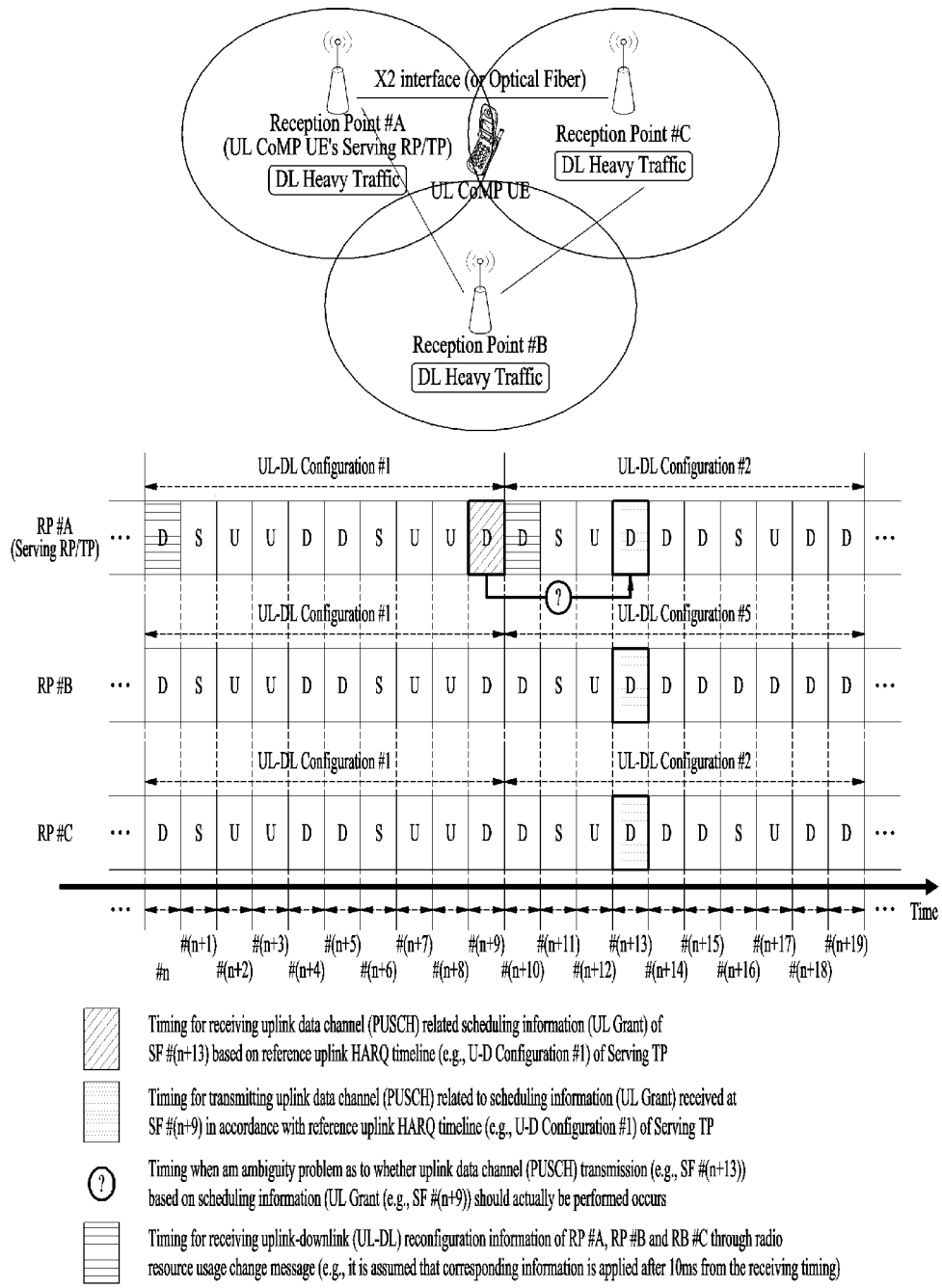

FIGS. 10 and 11 illustrates that ambiguity problems as to whether corresponding scheduling information or PHICH information based uplink data channel transmission should be performed occur when a specific UL CoMP UE receives uplink data channel transmission related scheduling information (UL grant) or PHICH information at a random time under an environment that cells joining uplink (UL) CoMP dynamically change a radio resource usage in accordance with their load state. In FIGS. 10 and 11, it is assumed that SIB (System Information Block) signal based uplink-downlink configurations of cells (that is, RP #A, RP #B, and RP #C) which join uplink CoMP communication are equally uplink-downlink configuration #1 (that is, DSUUDDSUUD).

In FIG. 10, it is assumed that RP (Reception Point) #A (that is, UL CoMP UE's Serving RP/Transmission Point (TP)) and RB #B of cells which join uplink CoMP communication have downlink load which is increased and RP #C has uplink load which is increased. Also, in FIG. 11, it is assumed that all cells (that is, RP #A, RP #B and RP #C) which join uplink CoMP communication have downlink load which is increased.

Also, in FIGS. 10 and 11, each cell re-changes uplink-downlink configurations based on a previously defined period (reconfiguration period) (for example, 10 ms) in accordance with its uplink/downlink load state change. Also, it is assumed that the serving cell (that is, UL CoMP UE's Serving RP/TP #A) transmits its uplink-downlink (UL-DL) reconfiguration information together with uplink-downlink reconfiguration information of other cells (that is, RP #B, RP #C) (that are received through an interface X2 or an optical fiber) which perform uplink cooperative communication with the serving cell, to the corresponding UE (UL CoMP UE) through a radio resource usage change message (reconfiguration message).

Also, in FIGS. 10 and 11, it is assumed that each of individual cells (that is, RP #A, RB #B and RB #C) which perform dynamic change of a radio resource usage manages uplink communication and downlink communication based on reference uplink HARQ timeline configuration and reference downlink HARQ timeline configuration.

In this way, the individual cells can assure a stable uplink/downlink HARQ timeline for UEs regardless of (re-)change of their uplink-downlink configurations. That is, the individual cells can define one of i) UL A/N transmission timeline for downlink data (PDSCH) reception in accordance with a reference downlink HARQ timeline, ii) uplink data channel (PUSCH) transmission timeline for uplink scheduling information (UL grant) reception in accordance with a reference uplink HARQ timeline, iii) a PHICH reception timeline for uplink data channel (PUSCH) transmission, and iv) uplink data channel (PUSCH) retransmission timeline for PHICH reception, for UEs regardless of (re-)change of their uplink-downlink configurations.

Also, the serving cell (that is, UL CoMP UE's Serving RP/TP #A) may be configured for the corresponding UE (UL CoMP UE) to identify the reference uplink/downlink HARQ timeline related uplink-downlink configuration information of the serving cell through a previously defined signaling/configuration/rule, or may be configured for the corresponding UE to identify reference uplink/downlink HARQ timeline related uplink-downlink configuration information of the serving cell and reference uplink/downlink HARQ timeline related uplink-downlink configuration information of other cells (that is, RP #B, RP #C) (that are received through an interface X2 or an optical fiber) which perform uplink cooperative communication with the serving cell.

In FIGS. 10 and 11, it is assumed that reference uplink HARQ timeline related uplink-downlink configuration information of all cells (that is, RP #A, RP #B, RP #C) which join uplink CoMP communication is equally set to uplink-downlink configuration #1 (that is, DSUUDDSUUD) (that is, set equally to uplink-downlink configuration on SIB). In this case, it is assumed that the corresponding UE (UL CoMP UE) performs uplink CoMP communication in accordance with the reference uplink HARQ timeline (that is, uplink-downlink configuration #1 based uplink HARQ timeline) of the serving cell (that is, UL CoMP UE's Serving RP/TP #A). On the other hand, in FIGS. 10 and 11, it is assumed that the reference downlink HARQ timeline related uplink-downlink configuration information of RP #A (that is, UL CoMP UE's Serving RP/TP) and RP #C of cells which join uplink CoMP communication is set to an uplink-downlink configuration #2 (that is, DSUDDDSUDD) and that the reference downlink HARQ timeline related uplink-downlink configuration information of RP #B is set to an uplink-downlink configuration #5 (that is, DSUDDDDDDD).

In FIGS. 10 and 11, although a specific UE (UL CoMP UE) receives uplink data channel (PUSCH) transmission related scheduling information (UL grant) or PHICH information at a time SF #(N+9) based on the reference uplink HARQ timeline of the serving cell (that is, UL CoMP UE's Serving RP/TP #A), radio resource usages of some or all of cells which join uplink CoMP communication are not set to uplink resources (for example, uplink subframes) at a time SF #(N+13) when corresponding scheduling information or PHICH information based uplink data channel transmission is performed.

In this case, the specific UE (UL CoMP UE) has a difficulty in determining whether corresponding uplink scheduling information or PHICH information (that is, SF #(N+9)) based uplink data channel transmission (that is, SF #(N+13)) is defined based on i) uplink-downlink configuration of a cell (or RP) which joins uplink CoMP communication, ii) an uplink resource of a cell (or RP) which joins uplink CoMP communication, or iii) is defined for a cell (or RP) which joins uplink CoMP communication. Therefore, a problem occurs in determining validity of corresponding uplink scheduling information or PHICH information, or an ambiguity problem as to whether corresponding uplink scheduling information or PHICH information based uplink data channel transmission is actually performed occurs.

Therefore, when cells joining uplink CoMP communication dynamically change a radio resource usage in accordance with their load state, the present invention suggests methods for efficiently determining validity of uplink scheduling information (UL grant) and PHICH information, which is received at a random time, in a specific UE (UL CoMP UE) or method for efficiently determining validity of uplink data channel (PUSCH) transmission based on uplink scheduling information or PHICH information, which is received at a random time.

The embodiments/methods/configurations of the present invention may be extended to even a case that some (or all) of cells which join uplink CoMP communication perform a dynamic change of a radio resource usage. Also, the embodiments of the present invention may be extended to even a case that a CoMP communication related serving transmission point (serving TP, for example, downlink data channel transmission, downlink data channel transmission related control channel transmission, uplink data channel transmission related control channel transmission) and a serving reception point (serving RP, for example, uplink data channel reception, uplink control channel reception) of the specific UE (CoMP UE) are configured differently from each other.

Also, although the embodiments/methods/configurations of the present invention may be extended to a case that physical cell IDs or virtual cell IDs of cells which join CoMP communication are identical to one another, the embodiments/methods/configurations of the present invention may be extended to even a case that (some) physical cell IDs or (some) virtual cell IDs of cells which join CoMP communication are different from one another.

Also, the embodiments/methods/configurations of the present invention may be extended to i) a case that uplink/downlink communication of a specific UE (CoMP UE) is managed based on previously defined reference uplink/downlink HARQ timeline configurations or ii) a case that uplink/downlink communication of a specific UE (CoMP UE) is managed based on an uplink/downlink HARQ timeline of (re-)changed uplink-downlink configuration.

1. Validity Determination of Uplink Scheduling Information

Hereinafter, in the present invention, when an UL CoMP UE transmits an uplink data channel (PUSCH) at a time (that is, SF #(N+K)) based on uplink scheduling information (UL grant) or PHICH information, which is received at a specific time (that is, SF #N), validity (or validity of corresponding uplink data channel transmission) of corresponding uplink scheduling information or PHICH information may be defined by one of methods 1-1 to 1-8. In this case, a relationship between a reception time of the uplink scheduling information or PHICH information and an uplink data channel transmission time linked to the reception time may be configured based on previously defined reference uplink HARQ timeline information or uplink/downlink HARQ timeline information of (re-) changed uplink-downlink configuration.

1-1th Method

According to the 1-1th method of the present invention, if an uplink data channel transmission timing (that is, SF #(N+K)) based on uplink scheduling information or PHICH information, which is received at a specific time (that is, SF #N), is a subframe position (that is, DL SF) commonly (re-)used for downlink communication by all cells RP which join uplink CoMP communication, a UE (UL CoMP UE) may be configured to determine that the corresponding uplink scheduling information or PHICH information is not valid (for example, false detection, misconfiguration) and not to perform uplink data channel transmission linked with the uplink scheduling information or PHICH information.

For example, if the 1-1th method is applied in FIG. 11, the UE (UL CoMP UE) does not perform uplink data channel transmission related to uplink scheduling information or PHICH information, which is received at a time SF #(N+9), at a time SF #(N+13).

1-2th Method

According to the 1-2th method of the present invention, only if an uplink data channel transmission timing (that is, SF #(N+K)) based on uplink scheduling information or PHICH information, which is received at a specific time (that is, SF #N), is a subframe position (that is, UL SF) commonly (re-)used for uplink communication by all cells RP which join uplink CoMP communication, a UE (UL CoMP UE) may be configured to determine that the corresponding uplink scheduling information or PHICH information is valid and perform uplink data channel transmission linked with the uplink scheduling information or PHICH information.

1-3th Method

According to the 1-3th method of the present invention, if an uplink data channel transmission timing (that is, SF #(N+K)) based on uplink scheduling information or PHICH information, which is received at a specific time (that is, SF #N), is a subframe position (that is, UL SF) commonly (re-)used for uplink communication by at least one of all cells RP which join uplink CoMP communication, a UE (UL CoMP UE) may be configured to determine that the corresponding uplink scheduling information or PHICH information is valid and perform uplink data channel transmission linked with the uplink scheduling information or PHICH information.

For example, if the 1-3th method is applied in FIG. 10, the UE (UL CoMP UE) performs uplink data channel transmission related to uplink scheduling information or PHICH information, which is received at a time SF #(N+9), at a time SF #(N+13).

1-4th Method

According to the 1-4th method of the present invention, if an uplink data channel transmission timing (that is, SF #(N+K)) based on uplink scheduling information or PHICH information, which is received at a specific time (that is, SF #N), is an uplink subframe position (that is, UL SF) commonly on reference downlink HARQ timeline related uplink-downlink configurations of all cells RP which join uplink CoMP communication, or an uplink subframe position (that is, UL SF) commonly on reference uplink HARQ timeline related uplink-downlink configurations of all cells RP which join uplink CoMP communication, a UE (UL CoMP UE) may be configured to determine that the corresponding uplink scheduling information or PHICH information is valid and perform uplink data channel transmission linked with the uplink scheduling information or PHICH information.

1-5th Method

According to the 1-5th method of the present invention, if an uplink data channel transmission timing (that is, SF #(N+K)) based on uplink scheduling information or PHICH information, which is received at a specific time (that is, SF #N), is an uplink subframe position (that is, UL SF) on reference downlink HARQ timeline related uplink-downlink configuration of at least one of all cells RP which join uplink CoMP communication, or an uplink subframe position (that is, UL SF) on reference uplink HARQ timeline related uplink-downlink configurations of at least one of all cells RP which join uplink CoMP communication, a UE (UL CoMP UE) may be configured to determine that the corresponding uplink scheduling information or PHICH information is valid and perform uplink data channel transmission linked with the uplink scheduling information or PHICH information.

1-6th Method

According to the 1-6th method of the present invention, an additional field may be defined to indicate a corresponding target one of cells RP, which join UL CoMP communication, to which uplink scheduling information transmitted on a DCI format (for example, DCI format 0/4) at a specific time (that is, SF #N) is signaled.

For example, information according to this method may be configured to be implicitly identified by reusing (or reinterpreting) the legacy field on the DCI format, to which uplink scheduling information is transmitted, in accordance with a previously defined rule without definition of additional field. For example, a DM-RS cyclic shift field (that is, 3 bits) on a DCI format 0/4 may be reused, and a base station may be configured to notify a UE of information on a target cell linked with each field value through a previously defined signal, whereby the information may be identified.

Also, the information according to this method may be implemented using i) physical cell ID or virtual cell ID of a target cell, or ii) non-zero power CSI configuration information (for example, CoMP scenario 4) linked with the target cell.

Additionally, if the UE may identify i) uplink-downlink configuration information linked with specific physical ID (or virtual ID) or ii) uplink-downlink configuration information liked with specific non-zero power CSI configuration information (that is, corresponding non-zero power CSI configuration information is linked with a specific cell) through reception/configuration/rule of a previously defined signal, the UE may be configured to determine that corresponding uplink scheduling information is finally valid only if an uplink data channel transmission timing (that is, SF #(N+K)) based on the uplink scheduling information received at a specific time (that is, SF #N) is an uplink subframe position on uplink-downlink configuration of the target cell of the corresponding uplink scheduling information and perform uplink data channel transmission linked with the uplink scheduling information.

1-7th Method

According to the 1-7th method of the present invention, a serving cell may be configured to identify information on downlink subframe positions to which uplink scheduling information (or PHICH information) valid for a UL CoMP cell set of a UE (UL CoMP UE) is received or information on uplink subframe positions where valid uplink data channel transmission is performed, through a signal/configuration/rule previously defined for the corresponding UE.

In this case, the information according to this method may be implemented in the form of a bitmap of a previously defined (period) length. Also, this information may be updated based on a previously defined period.

1-8th Method

According to the 1-8th method of the present invention, a downlink (serving) transmission point (for example, downlink data channel transmission, downlink data channel transmission related control channel transmission, uplink data channel transmission related control channel transmission) of a CoMP UE and an uplink (serving) reception point (for example, uplink data channel reception, uplink control channel reception) of the CoMP UE may be configured differently from each other. In this case, the serving cell may be configured to notify the corresponding UE of uplink-downlink (re-) configuration information of the uplink (serving) reception point through a previously defined signal independently from uplink-downlink (re-)configuration information of the downlink (serving) transmission point.

2. Validity Determination of Uplink Scheduling Information

Hereinafter, prior to description of the present invention, a PQI (PDSCH RE Mapping and Quasi-Co-Location Indicator) will be described. A PQI (PDSCH RE Mapping and Quasi-Co-Location Indicator) field exist on a DCI format 2D related to a legacy TM 10. This field is used to indicate "PDSCH RE Mapping information" and "PDSCH Antenna Port Quasi-Co-Location (QCL) information" on a downlink data channel (PDSCH) based on the corresponding DCI format 2D (scheduling).

In more detail, the DCI format 2D is defined to support CoMP communication between base stations, and is related to a transmission mode 10. That is, 4 parameter sets may be configured through higher layer signaling to decode a PDSCH in accordance with a PDCCH/EPDCCH signal that includes a DCI format 2D detected for a UE configured by a transmission mode 10 with respect to an allocated serving cell. Detailed description of each field included in the DCI format 2D will be understood with reference to a clause 5.3.3.1.5D of a 3GPP TS 36.212 v11.3 document.

The following Table 5 illustrates an example of a PQI field included in the DCI format 2D.

TABLE 5

| Value of 'PDSCH RE Mapping and Quasi-Co-Location Indicator' field | Description |
|---|---|
| '00' | Parameter set 1 configured by higher layers |

TABLE 5-continued

| Value of 'PDSCH RE Mapping and Quasi-Co-Location Indicator' field | Description |
| --- | --- |
| '01' | Parameter set 2 configured by higher layers |
| '10' | Parameter set 3 configured by higher layers |
| '11' | Parameter set 4 configured by higher layers |

Parameters disclosed in the following Table 6 are those for determining PDSCH RE mapping and PDSCH antenna port QCL (Quasi-Co-Location). With respect to a PDSCH having no corresponding PDCCH/EPDCCH, the UE uses a parameter set indicated by PDCCH/EPDCCH on the DCI format 2D corresponding to SPS activation associated to determine PDSCH RE mapping and PDSCH antenna port QCL (Quasi-Co-Location). In Table 5, the PQI field indicates each parameter set configured through higher layer signaling.

TABLE 6

| Parameter | Description |
| --- | --- |
| crs-PortsCount-r11 | Number of CRS antenna ports for DPSCH RE mapping |
| crs-FreqShift-r11 | CRS frequency shift for PDSCH RE mapping |
| mbsfn-SubframeConfigList-r11 | MBSFN subframe configuration for PDSCH RE mapping |
| csi-RS-ConfigZPId-r11 | Zero-power CSI-RS resource configuration for PDSCH RE mapping |
| pdsch-Start-r11 | PDSCH starting position for PDSCH RE mapping |
| qcl-CSI-RS-ConfigNZPId-r11 | CSI-RS resource configuration identity for Quasi-Co-Location |

Referring to Table 6, a parameter 'crs-PortsCount-r11' indicates the number of CRS antenna ports for PDSCH RE mapping, a parameter 'crs-FreqShift-r11' indicates a CRS frequency shift value for PDSCH RE mapping, and a parameter 'mbsfn-SubframeConfigList-r11' indicates MBSFN subframe configuration for PDSCH RE mapping. Also, a parameter 'csi-RS-ConfigZPId-r11' indicates zero-power CSI-RS resource configuration for PDSCH RE mapping, a parameter 'pdsch-Start-r11' indicates a PDSCH start position for PDSCH RE mapping, and a parameter 'qcl-CSI-RS-ConfigNZPId-r11' is used to identify CSI-RS resource configuration for QCL.

In Table 5, parameter sets 1, 2, 3 and 4 are configured by combination of the parameters disclosed in Table 6, and information on parameter combination included in each parameter set is notified to the UE through higher layer signaling.

For example, for decoding of PDSCH based on PDCCH/EPDCCH transmitted on a DCI format 1A CRC scrambled with C-RNTI for the UE and the allocated serving cell and PDSCH transmission through an antenna port 7, the UE configured by the transmission mode 10 with respect to the allocated serving cell should use a parameter set 1 for determining PDSCH RE mapping and PDSCH antenna port QCL disclosed in Table 5 if a type B QCL type is configured to the UE.

Also, for example, for decoding of PDSCH based on PDCCH/EPDCCH transmitted on a DCI format 1A CRC scrambled with C-RNTI for the UE and the allocated serving cell and PDSCH having no PDCCH/EPDCCH associated with SPS activation indicated by the PDCCH/EPDCCH of the DCI format 1A, the UE configured by the transmission mode 10 with respect to the allocated serving cell should use a parameter set 1 for determining PDSCH RE mapping and PDSCH antenna port QCL disclosed in Table 5 if a type B QCL type is configured to the UE.

For PDCCH/EPDCCH decoding on the DCI format 1A for the detected UE and the allocated serving cell and PDSCH transmission on antenna ports 0 to 3, the UE configured by the transmission mode 10 with respect to the allocated serving cell determines PDSCH RE mapping by using a zero-power CSI-RS resource having the lowest index.

Based on the aforementioned description, when cells which join downlink CoMP communication dynamically change a radio resource usage in accordance with their load state, methods for efficiently determining validity of downlink scheduling information (DL grant) received at a random time, in a specific UE (DL CoMP UE) or method for efficiently determining validity of downlink data channel (PDSCH) reception based on downlink scheduling information received at a random time will be suggested.

As illustrated in Table 5 and Table 6, in case of transmission of downlink data channel or downlink scheduling information, non-zero power CSI configuration information (that is, qcl-CSI-RS-ConfigNZPId-r11) (PDSCH Antenna Port) quasi-co-located (QCL) through the aforementioned PQI field (that is, DCI format 2D) may be notified.

Therefore, considering the above operation, the base station may previously signal uplink-downlink configuration information corresponding to (or linked with) non-zero power CSI configuration information to the UE. Also, the UE may be configured to identify uplink-downlink configuration information through a downlink data channel or downlink scheduling information related PQI field (that is, non-zero power CSI configuration information which is PDSCH antenna port quasi-co-located (QCL)), which is received at a random time, wherein the corresponding downlink data channel (or downlink scheduling information) is transmitted/received based on the uplink-downlink configuration information. That is, the UE may be configured to identify validity of the corresponding downlink data channel or downlink scheduling information through the PQI field.

In this case, in case of a specific coordinated communication scenario (that is, CoMP scenario 4) where physical cell IDs of transmission/reception points (TPs/RPs) are the same as one another, the transmission/reception points may be identified from one another by different non-zero power CSI configurations. Under the circumstances, if the present invention is applied, the UE may identify uplink-downlink configuration information (that is, validity of the corresponding downlink data channel or downlink scheduling information) through the downlink data channel or downlink scheduling information related PQI field (that is, non-zero power CSI configuration information which is PDSCH antenna port quasi-co-located (QCL)), wherein the corresponding downlink data channel or downlink scheduling information is transmitted/received based on the uplink-downlink configuration information, and may also identify a transmission point (TP/RP) through which the corresponding downlink data channel or downlink scheduling information is transmitted.

The following methods of the present invention are useful for a case where the UE efficiently determines validity of the corresponding downlink data channel or downlink scheduling information in case of downlink data channel or downlink scheduling information transmission/reception based on the DCI format (for example, DCI format 1A) in which the PQI field is not defined.

In the present invention, validity of downlink scheduling information (DL grant) received by a coordinated communication related UE (DL CoMP UE) at a specific time (that is, SF #N) or validity of downlink data channel (PDSCH) reception based on corresponding downlink scheduling information (received at a specific time) may be defined by one of the following methods 2-1 to 2-8. In this case, a relationship between a reception time of downlink scheduling information or a downlink data channel based on the corresponding downlink scheduling information and a UL ACK/NACK transmission time linked with the reception time may be configured based on previously defined reference downlink HARQ timeline information or uplink/downlink HARQ timeline information of (re-)changed uplink-downlink configuration.

2-1th Method

According to the 2-1th method of the present invention, if a specific time (that is, SF #N) when downlink scheduling information or a downlink data channel based on the corresponding downlink scheduling information is received is a subframe position (that is, UL SF) commonly (re-)used for uplink communication by all cells TP which join downlink CoMP communication, a UE (DL CoMP UE) may be configured to determine that the corresponding downlink scheduling information is not valid (for example, false detection, misconfiguration) and not to perform downlink data channel reception linked with the downlink scheduling information.

2-2th Method

According to the 2-2th method of the present invention, only if a specific time (that is, SF #N) when downlink scheduling information or a downlink data channel based on the corresponding downlink scheduling information is received is a subframe position (that is, DL SF) commonly (re-)used for downlink communication by all cells TP which join downlink CoMP communication, a UE (DL CoMP UE) may be configured to determine that the corresponding downlink scheduling information is valid and perform downlink data channel reception linked with the downlink scheduling information.

2-3th Method

According to the 2-3th method of the present invention, if a specific time (that is, SF #N) when downlink scheduling information or a downlink data channel based on the corresponding downlink scheduling information is received is a subframe position (that is, DL SF) (re-)used for downlink communication by at least one of all cells TP which join downlink CoMP communication, a UE (DL CoMP UE) may be configured to determine that the corresponding downlink scheduling information is valid and perform downlink data channel reception linked with the downlink scheduling information.

2-4th Method

According to the 2-4th method of the present invention, if a specific time (that is, SF #N) when downlink scheduling information or a downlink data channel based on the corresponding downlink scheduling information is received is a downlink subframe position (that is, DL SF) commonly on reference uplink HARQ timeline related uplink-downlink configurations of all cells TP which join downlink CoMP communication, or an uplink subframe position (that is, DL SF) commonly on reference downlink HARQ timeline related uplink-downlink configurations of all cells RP which join downlink CoMP communication, a UE (DL CoMP UE) may be configured to determine that the corresponding downlink scheduling information is valid and perform downlink data channel reception linked with the downlink scheduling information.

2-5th Method

According to the 2-5th method of the present invention, if a specific time (that is, SF #N) when downlink scheduling information or a downlink data channel based on the corresponding downlink scheduling information is received is a downlink subframe position (that is, DL SF) on reference downlink HARQ timeline related uplink-downlink configuration of at least one of all cells RP which join downlink CoMP communication, or a downlink subframe position (that is, DL SF) on reference downlink HARQ timeline related uplink-downlink configurations of at least one of all cells TP which join downlink CoMP communication, a UE (DL CoMP UE) may be configured to determine that the corresponding downlink scheduling information is valid and perform downlink data channel reception linked with the downlink scheduling information.

2-6th Method

According to the 2-6th method of the present invention, an additional field may be defined to indicate a corresponding one of cells TP, which join downlink CoMP communication, from which downlink scheduling information received on a DCI format (for example, DCI format 1A) at a specific time (that is, SF #N) is signaled.

In this case, information according to this 2-6th method may be configured to be implicitly identified by reusing (or reinterpreting) the legacy field on the DCI format, to which downlink scheduling information is transmitted, in accordance with a previously defined configuration/rule without definition of additional field.

Also, the corresponding information may be implemented using i) physical cell ID or virtual cell ID of a transmission cell, or ii) non-zero power CSI configuration information (for example, CoMP scenario 4) linked with the transmission cell.

Additionally, if the UE may identify i) uplink-downlink configuration information linked with specific physical ID (or virtual ID) or ii) uplink-downlink configuration information linked with specific non-zero power CSI configuration information (that is, corresponding non-zero power CSI configuration information is linked with a specific cell) through reception/configuration/rule of a previously defined signal, the UE may be configured to determine that corresponding uplink scheduling information is finally valid only if downlink scheduling information received at a specific time (that is, SF #N) is an uplink subframe position on uplink-downlink configuration of the transmission cell (of the corresponding downlink scheduling information) and perform downlink data channel reception linked with the downlink scheduling information.

2-7th Method

According to the 2-7th method of the present invention, a serving cell may be configured to identify downlink scheduling information valid for a downlink CoMP cell set of a UE (DL CoMP UE) or information on downlink subframe positions to which a valid downlink channel is received, through a signal/configuration/rule previously defined for the corresponding UE. Alternatively, in the same way, the serving cell may be configured to identify the information on valid uplink subframe positions where valid UL ACK/NACK transmission for the downlink CoMP cell set of the corresponding UE is performed. In this case, the corresponding information may be implemented in the form of a bitmap of a previously defined (period) length. Also, this information may be updated based on a previously defined period.

2-8th Method

According to the 2-8th method of the present invention, a downlink (serving) transmission point (for example, downlink data channel transmission, downlink data channel transmission related control channel transmission, uplink data channel transmission related control channel transmission) of a CoMP UE and an uplink (serving) reception point (for example, uplink data channel reception, uplink control channel reception) of the CoMP UE may be configured differently from each other. In this case, the serving cell may be configured to notify the corresponding UE of uplink-downlink (re-) configuration information of the uplink (serving) transmission point through a previously defined signal independently from uplink-downlink (re-)configuration information of the uplink (serving) reception point (RP).

Moreover, the aforementioned embodiments/methods of the present invention may be configured to be restrictively applied only if a dynamic change mode of a radio resource usage is configured.

Also, the aforementioned embodiments/methods of the present invention may be configured to be restrictively applied only for a flexible resource set or static resource set.

Also, the aforementioned embodiments/methods of the present invention may be configured to be restrictively applied only in either RRC_CONNECTED mode of the UE or IDLE mode.

Also, the aforementioned embodiments/methods of the present invention may be configured to be restrictively applied only in specific communication (for example, downlink communication and/or uplink communication). Additionally, the aforementioned embodiments/methods of the present invention may be configured to be restrictively applied only in PCell or SCell where a dynamic change mode of a radio resource usage is configured.

Although the aforementioned embodiments of the present invention may be implemented independently, the embodiments may be implemented in the form of combination/incorporation of at least one embodiment.

Also, information on the aforementioned rule/configuration/embodiments of the present invention or information as to whether the corresponding rule/configuration/embodiments are applied may be notified from the base station to the UE through a previously defined signal (for example, physical layer or higher layer signal).

Figure 12:
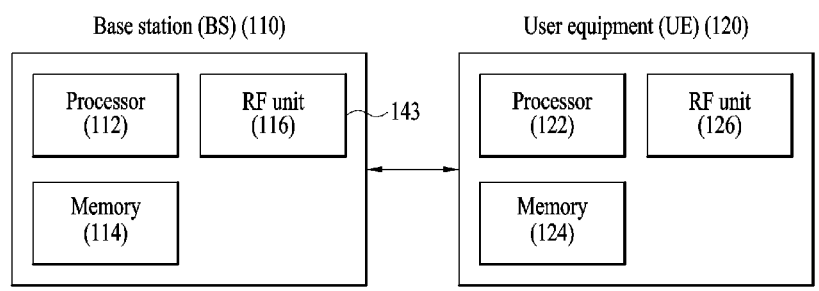
FIG. 12 is a diagram illustrating a base station and a user equipment, which may be applied to one embodiment of the present invention.

FIG. 12 is a diagram illustrating a base station and a user equipment, which may be applied to one embodiment of the present invention.

If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 12, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The 'base station' (BS) may be replaced with terminologies such as a fixed station, Node B, eNode B (eNB), and an access point (AP).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention may be implemented by a type of a module, a procedure, or a function, which performs functions or operations described as above. A software code may be stored in a memory unit and then may be driven by a processor.

The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for determining validity of scheduling information in a wireless communication supporting a usage change of a radio resource and the apparatus therefor have been described based on the 3GPP LTE system, the method and apparatus may be applied to various wireless communication systems in addition to the 3GPP LTE system.

The invention claimed is:

1. A method for transmitting and receiving signals to and from a plurality of coordinated multiple-point transmission (CoMP) cells by a user equipment in a wireless communication system supporting a usage change of a radio resource, the method comprising:
receiving, from the plurality of CoMP cells, uplink scheduling information indicating a second subframe at a first subframe; and
if it is determined that the uplink scheduling information is valid, transmitting an uplink data channel (physical uplink shared channel (PUSCH)) at the second subframe,
wherein the uplink scheduling information is determined to be valid when the second subframe is configured to be used for uplink transmission for all of the plurality of CoMP cells.

2. The method according to claim 1, wherein the first subframe and the second subframe are configured in accordance with an uplink-downlink timeline defined to change a usage of at least a part of radio resources corresponding to a reference HARQ timeline.

3. The method according to claim 1, wherein the uplink scheduling information is determined to be valid if the first subframe is a subframe indicated to be valid by a previously defined signal.

4. The method according to claim 1, further comprising:
receiving configuration for each of a downlink transmission point and an uplink reception point through a previously defined signal.

5. A user equipment (UE) for transmitting and receiving signals to and from a plurality of coordinated multiple-point transmission (CoMP) cells in a wireless communication system supporting a usage change of a radio resource, the UE comprising:
a radio frequency unit; and
a processor,
wherein the processor is configured to:
receive, via the radio frequency unit from the plurality of CoMP cells, uplink scheduling information indicating a second subframe at a first subframe; and
if it is determined that the uplink scheduling information is valid, transmit an uplink data channel (physical uplink shared channel (PUSCH)) at the second subframe,
wherein the uplink scheduling information is determined to be valid when the second subframe is configured to be used for uplink transmission for all of the plurality of CoMP cells.

* * * * *